Patented July 1, 1941

2,247,403

UNITED STATES PATENT OFFICE 2,247,403

ARALKYL POLYNUCLEAR PHENOL

Ralph P. Perkins and Fred Bryner, Midland, Mich., assignors to The Dow Chemical Company, Midland, Mich., a corporation of Michigan No Drawing. Application March 24, 1939, Serial No. 263,911

11 Claims. (Cl. 260—619)

This invention relates to a class of new aralkyl polynuclear phenols and to a method of making the same.

The new phenols of the present invention correspond to the general formula

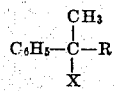

wherein X is a hydroxylated polynuclear aryl or mono-halo-aryl radical having a hydroxyl group in a position ortho or para to the attached aralkyl radical, and R is hydrogen or a lower alkyl radical. They are useful as germicides and fungicides, and as intermediates in the manufacture of synthetic resins and insecticides.

The new products may be prepared by reacting a 2-phenyl-1-alkene, e. g. styrene, alpha-methyl styrene, alpha-ethyl styrene, etc., with a suitable phenol, i. e. with a hydroxylated polynuclear aromatic hydrocarbon or mono-halo hydrocarbon having a hydrogen atom in a position ortho or para to that of a hydroxyl group, in the presence of a condensation catalyst.

According to one procedure, a mixture of the phenolic reactant and a small proportion, i. e. 0.1 to 10.0 per cent by weight, of a condensation catalyst is heated to a reaction temperature, e. g. 100° C. to 200° C., depending upon the reactants employed, and the phenyl alkene is added slowly with agitation. The mixture is then heated for a time to insure completion of the reaction, after which the catalyst is removed by known means, and the mixture is fractionally distilled at reduced pressure to separate the desired aralkyl polynuclear phenol. Although the reactants may be mixed in any desired proportions, in most reactions we prefer to employ about 1.5 to 2.5 mols of the phenol per mol of the styrene compound. If the phenol to be reacted is a solid at operating temperatures, the reaction may be carried out in an inert solvent.

When aralkylation of a polynuclear phenol is carried out as described, the reaction product is largely a para-substituted phenol, provided a position para to a hydroxyl group in the reactant phenol is open for substitution. When such para position is not open, the aralkyl group will enter a position ortho to a hydroxyl group. If, however, all the positions ortho and para to the hydroxyl groups are filled, reaction according to the invention has not been found possible. For that reason, the phenolic reactants in our process are limited to hydroxylated polynuclear hydrocarbons and halohydrocarbons which have a hydrogen atom in a position ortho or para to a hydroxyl group. Examples of such phenols are: o-phenyl phenol, m-phenyl phenol, p-phenyl phenol, 4-hydroxy-2-chloro biphenyl, 4-phenyl catechol, alpha naphthol, beta naphthol, 4-bromo alpha naphthol, alpha-beta dihydroxy naphthalene, alpha anthrol, beta anthrol, and the like.

In practice we may employ as catalyst any of a wide variety of condensation catalysts, e. g. aluminum chloride, zinc chloride, sulphuric acid, phosphoric acid, acid-activated bleaching earths, etc. However, we prefer to use a small proportion of hydrogen chloride or hydrogen bromide either per se or in aqueous solution, since these catalysts permit a smooth reaction with minimum formation of by-products, and are easily removed from the crude aralkylated phenol product.

The following examples are illustrative of our invention, but are not to be construed as limiting its scope:

Example 1

A mixture of 2 mols (340 grams) of m-phenyl phenol and 1 c. c. of concentrated hydrochloric acid was heated to a temperature of 140° to 160° C., and 1 mol (118 grams) of alpha-methyl styrene was added slowly with agitation during 0.2 hour. The resulting mixture was then heated at 165° to 170° C. for 0.5 hour more to allow the reaction to reach completion. The crude product was then cooled, neutralized with aqueous sodium hydroxide, and fractionally distilled at an absolute pressure of 5 millimeters of mercury. In this way there were recovered some unreacted alpha-methyl styrene and m-phenyl phenol, together with 70 grams of a white crystalline solid. This material, when recrystallized from cyclohexane, had a melting point of 87.5° C., a boiling point of 230° C. at 5 millimeters pressure, and was found to be 6-(alpha phenyl isopropyl)-3-hydroxy biphenyl

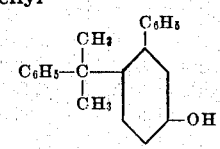

Example 2

Ortho phenyl phenol was reacted with alpha-methyl styrene in the proportions and under the same conditions as in Example 1, and the product was separated by fractional distillation.

There was obtained 5-(alpha phenyl isopropyl)-2-hydroxy biphenyl

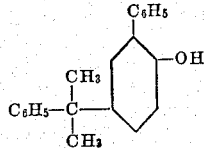

a colorless liquid have a boiling point of about 258° to 263 C. at a pressure of 25 millimeters of mercury.

*Example 3*

Beta naphthol was reacted with alpha-methyl styrene according to the procedure of Example 1. There was obtained an (alpha phenyl isopropyl)-2-naphthol, probably 6-(alpha phenyl isopropyl)-2-naphthol

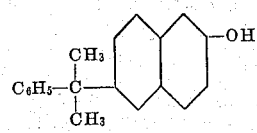

a white crystalline solid freezing at 99° C. and boiling at 230° C. under 5 millimeters pressure.

Other modes of applying the principle of the invention may be employed instead of those explained, change being made as regards the details disclosed, provided the product or method stated in any of the following claims or the equivalent of such stated product or method be obtained or employed.

We claim:

1. An aralkyl polynuclear phenol corresponding to the general formula

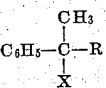

wherein X is a phenolic radical having a hydroxyl group in one of the positions ortho and para to the aralkyl radical and selected from the class consisting of hydroxylated polynuclear aryl and hydroxylated polynuclear mono-halo-aryl radicals, and R is a substituent selected from the class consisting of lower alkyl radicals.

2. An aralkyl polynuclear phenol corresponding to the general formula

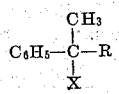

wherein X is a hydroxylated polynuclear aryl radical having a hydroxyl group in one of the positions ortho and para to the attached aralkyl radical, and R is a substituent selected from the class consisting of lower alkyl radicals.

3. 6-(alpha phenyl isopropyl)-3-hydroxy biphenyl, a white crystalline solid having a melting point of 87.5° C. and a boiling point of about 230° C. at 5 millimeters pressure.

4. 5-(alpha phenyl isopropyl)-2-hydroxy biphenyl, a colorless liquid having a boiling point of about 258°–263° C. under 25 millimeters pressure.

5. An (alpha phenyl isopropyl)-2-naphthol, a white crystalline solid having a melting point of about 99° C. and a boiling point of about 230° C. at 5 millimeters pressure, and being probably 6-(alpha phenyl isopropyl)-2-naphthol.

6. The method of preparing an aralkyl polynuclear phenol which comprises reacting a 2-phenyl-1-alkene selected from the class consisting of alpha-methyl styrene and alpha-ethyl styrene with a phenol having a hydrogen atom in one of the positions ortho and para to a hydroxyl group and selected from the class consisting of hydroxylated polynuclear aromatic hydrocarbons and hydroxylated polynuclear aromatic monohalo hydrocarbons, in the presence of a condensation catalyst.

7. The method of preparing an aralkyl polynuclear phenol which comprises reacting a 2-phenyl-1-alkene selected from the class consisting of alpha-methyl styrene and alpha-ethyl styrene with a phenol having a hydrogen atom in one of the positions ortho and para to a hydroxyl group and selected from the class consisting of hydroxylated polynuclear aromatic hydrocarbons and hydroxylated polynuclear aromatic mono-halo hydrocarbons, in the presence of a small proportion of a condensation catalyst.

8. The method of preparing an aralkyl polynuclear phenol which comprises reacting a 2-phenyl-1-alkene with a phenol having a hydrogen atom in one of the positions ortho and para to a hydroxyl group and selected from the class consisting of hydroxylated polynuclear aromatic hydrocarbons and hydroxylated polynuclear aromatic mono-halo hydrocarbons, in the presence of a small proportion of a hydrogen halide selected from the class consisting of hydrogen chloride and hydrogen bromide.

9. The method of preparing an aralkyl polynuclear phenol which comprises reacting a 2-phenyl-1-alkene with a hydroxylated polynuclear aromatic hydrocarbon having a hydrogen atom in one of the positions ortho and para to a hydroxyl group, in the presence of a small proportion of a hydrogen halide selected from the class consisting of hydrogen chloride and hydrogen bromide.

10. The method of preparing an (alpha phenyl isopropyl) polynuclear phenol which comprises reacting alpha-methyl styrene with a hydroxylated polynuclear aromatic hydrocarbon having a hydrogen atom in one of the positions ortho and para to the hydroxyl group, in the presence of between about 0.1 and about 10.0 parts by weight of a hydrogen halide selected from the class consisting of hydrogen chloride and hydrogen bromide per 100 parts of hydroxylated hydrocarbon and at a temperature between about 100° C. and about 200° C.

11. An aralkyl polynuclear halophenol corresponding to the general formula

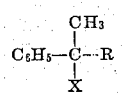

wherein X is a hydroxylated polynuclear monohaloaryl radical having a hydroxyl group in one of the positions ortho and para to the attached aralkyl radical, and R is a substituent selected from the class consisting of lower alkyl radicals and hydrogen.

RALPH P. PERKINS.
FRED BRYNER.